United States Patent [19]

Lundgren et al.

[11] Patent Number: 5,054,951
[45] Date of Patent: Oct. 8, 1991

[54] ARRANGEMENT FOR THE CONNECTION OF TUBES

[76] Inventors: Alvar Lundgren, Nedre Fagelbergsgatan, 4A Goteborg, Sweden, S-411 28; Anders Lundgren, Hinnebacksgatan 11, Goteborg, Sweden, S-417 47

[21] Appl. No.: 457,685
[22] PCT Filed: Aug. 19, 1988
[86] PCT No.: PCT/SE88/00424
  § 371 Date: Jan. 10, 1990
  § 102(e) Date: Jan. 10, 1990
[87] PCT Pub. No.: WO89/02034
  PCT Pub. Date: Mar. 9, 1989

[30] Foreign Application Priority Data

Sep. 4, 1987 [SE] Sweden ................ 8703450

[51] Int. Cl.⁵ .............................. F16B 7/00
[52] U.S. Cl. .................... 403/293; 403/297; 403/286
[58] Field of Search .............. 403/297, 293, 286

[56] References Cited

U.S. PATENT DOCUMENTS

| | | | |
|---|---|---|---|
| 2,290,430 | 7/1942 | Heiser | 403/297 |
| 2,483,341 | 9/1949 | Haas | 403/293 |
| 2,603,513 | 7/1952 | Greitzer | 403/293 |
| 3,547,475 | 12/1970 | Gingher | 403/297 |
| 3,606,408 | 9/1971 | Wagner | 403/297 |
| 4,570,408 | 2/1986 | Frascaroli et al. | 403/297 X |

FOREIGN PATENT DOCUMENTS

| | | |
|---|---|---|
| 2653750 | 1/1978 | Fed. Rep. of Germany . |
| 2947485 | 9/1981 | Fed. Rep. of Germany . |
| 394211 | 6/1977 | Sweden . |
| 1554888 | 10/1979 | United Kingdom . |

Primary Examiner—Andrew V. Kundrat
Attorney, Agent, or Firm—Dowell & Dowell

[57] ABSTRACT

A mechanical connection arrangement for tubes arranged alongside or after one another comprises a coupling ring or coupling piece (5,9) positioned at the end of the tube and surrounding the tube, a profiled rod (8) of constant cross-section facing inwards from the end of the tube (1,2), and at least one attachment device (6,7) arranged in the wall of the tube and at a certain distance from its end so executed as to engage with and to force the profiled rod (8) into contact with the internal surface of the tube (1,2) at contact points along two narrow contact lines or contact areas (14,15) running in the longitudinal sense of the tube (1,2).

10 Claims, 4 Drawing Sheets

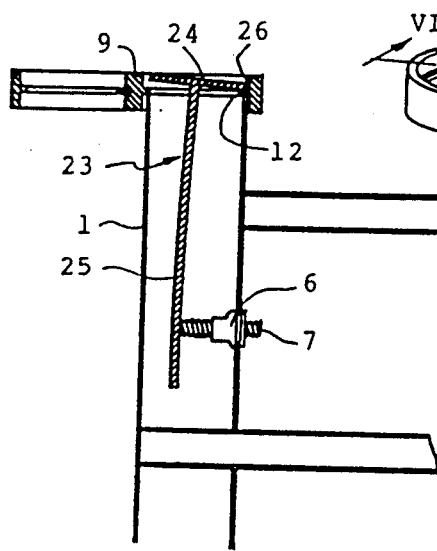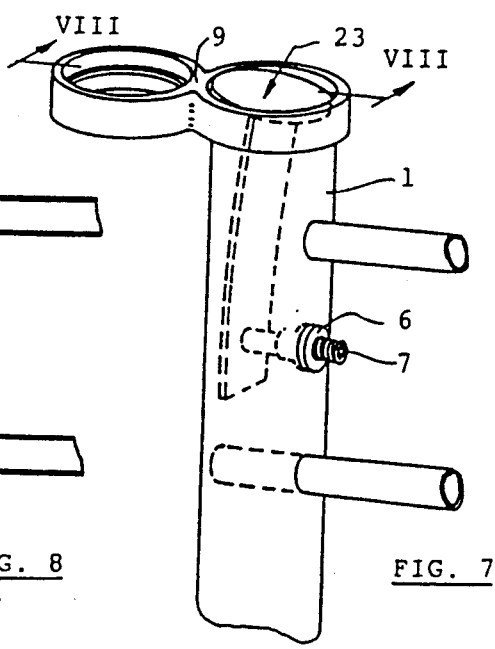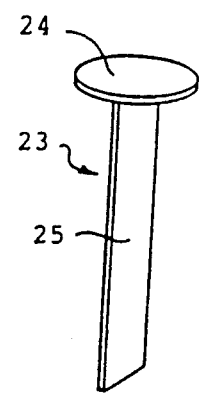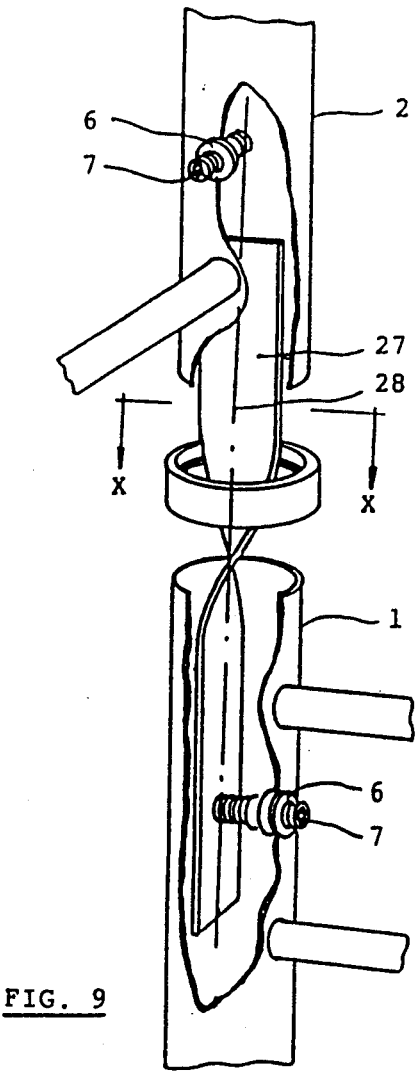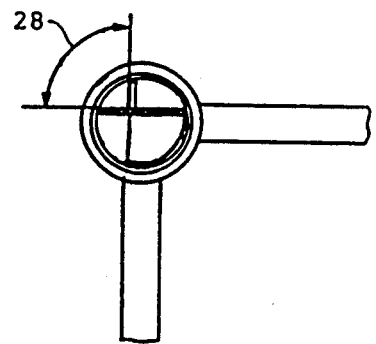
FIG. 8
FIG. 7
FIG. 6
FIG. 9
FIG. 10

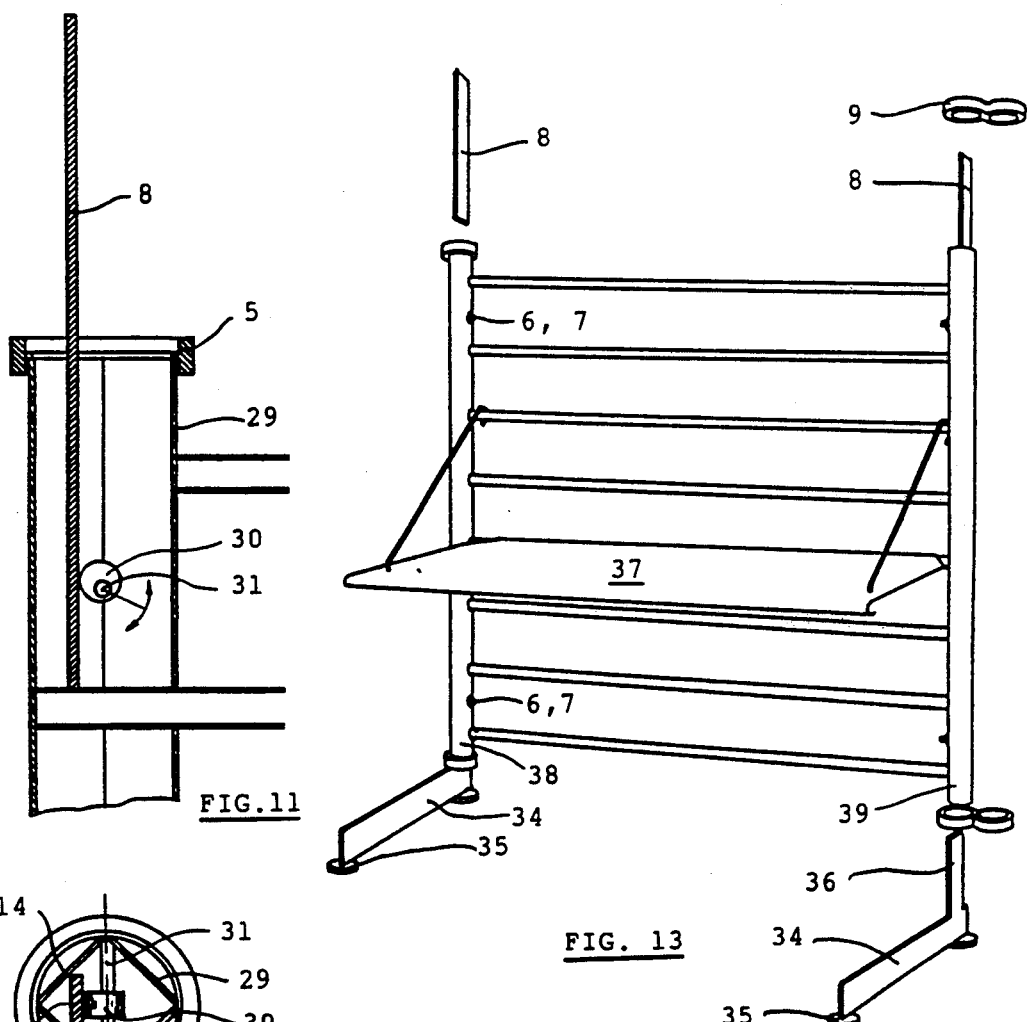
FIG. 11
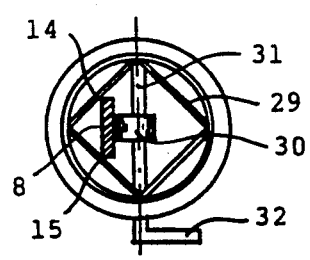
FIG. 12
FIG. 13
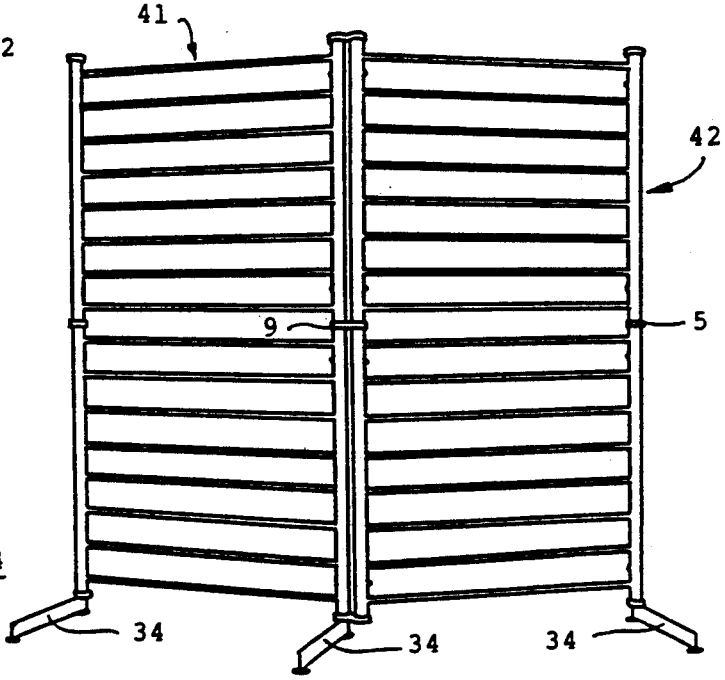
FIG. 14

ARRANGEMENT FOR THE CONNECTION OF TUBES

BACKGROUND OF THE INVENTION

1. Field of the Invention

The present invention relates to an arrangement for the mechanical connection of tubes of different cross-sectional form arranged alongside or after one another.

2. History of the Related Art

Tube connections of various kinds are already disclosed, in which use is made of expanding internal joint devices or joint devices with clamps which are tightened with a nut and bolt.

SUMMARY OF THE INVENTION

A simple and inexpensive, yet very effective connection arrangement is obtained by the arrangement in accordance with the invention. This is achieved by a coupling ring positioned at the end of a tube and surrounding the tube, a straight profiled rod of constant cross-section facing inwards from the end of the tube and passing through the coupling ring, and at least one attachment device arranged in the wall of the tube and at a certain distance from the end of the tube so constructed as to engage with and to force the profiled rod into contact with the internal surface of the tube at contact points along two contact lines or contact areas running longitudinally of the tube.

Additional advantages are achieved through the characteristic features indicated in the claims.

BRIEF DESCRIPTION OF THE DRAWINGS

The invention is now described in greater detail in relation to a number of embodiments given by way of example in conjunction with the accompanying drawings, in which:

FIG. 6 is a perspective view illustrating a locking component for the tube and the coupling ring;

FIG. 7 is an illustrational view of the locking component of FIG. 6 applied to a frame tube;

FIG. 8 is a section through the frame in FIG. 7 in accordance with the line VIII—VIII;

FIG. 9 is an illustrational assembly view showing connection components with a twisted profiled rod;

FIG. 10 shows a cross section taken through line X—X in FIG. 9;

FIG. 11 is a cross-sectional illustrational view showing components used for connection in the case of square tubes, with an eccentric as the attachment device;

FIG. 12 is a top plan view of FIG. 11;

FIG. 13 is a perspective illustrational view of a frame produced by means of the invention for supporting one or more shelves;

FIG. 14 is an illustrational view showing eight frame tubes, included in four frames, attached to one another and provided with feet;

DESCRIPTION OF THE PREFERRED EMBODIMENT

Figure 1:
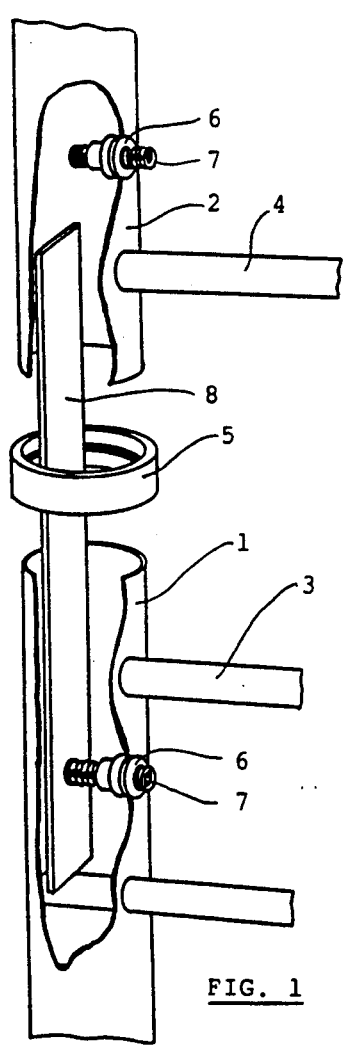
FIG. 1 illustrates in perspective having portions broken away two side tubes in a frame structure and components for connecting the tubes.

The designation 1 is used in FIG. 1 in respect of a frame tube which is a part of a frame, whereas 2 is used to designate the corresponding frame tube in an upper frame. 3 is one of the side tubes in the frame 1, and 4 is one of the side tubes in the frame 2. The designation 5 a simple coupling ring which is so structured as to be capable of accommodating on its inside the tubes 1 and 2, respectively on the lower side and on the upper side. The design of the ring is described in greater detail below.

Internally threaded blind rivets 6 are securely attached to the walls of the tubes 1 and 2 close to the ends of the tubes. Screws 7 with hexagonal socket heads are threaded into the rivets 6. These screws serve as attachment devices for the profiled rod 8. When screwed in fully, the screws force the profiled rod 8 against the inside of the tube walls so that longitudinal narrow contact lines or contact areas with contact points are formed. These exhibit considerable resistance to the displacement of the profiled rod in its longitudinal sense.

Figure 2:
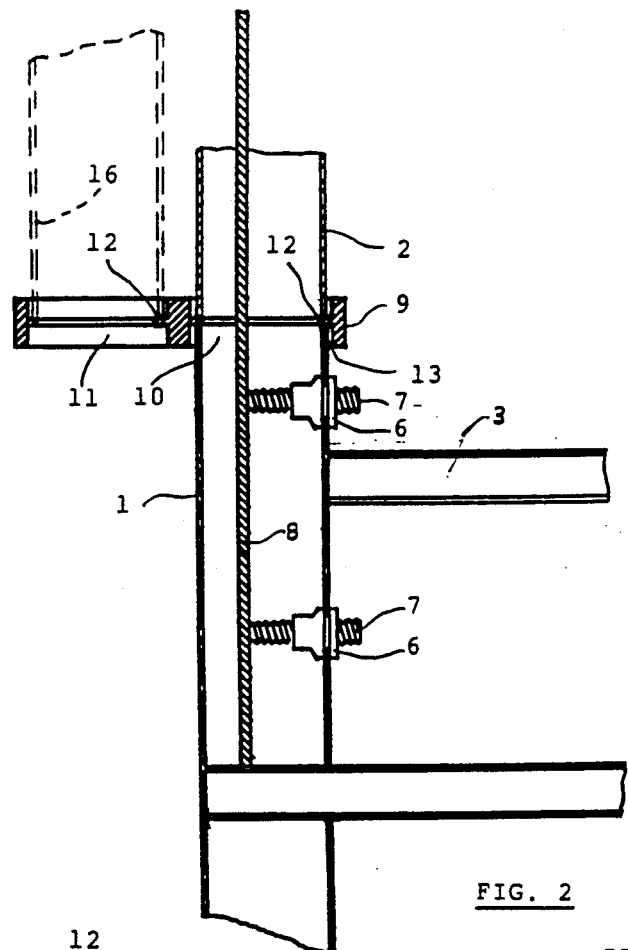
FIG. 2 illustrates a section through the frame tube in FIG. 1, but with a coupling ring for an additional tube.

FIG. 2 shows a section through a connection in the installed position, where two frame tubes 1 and 2 have been pushed in towards the coupling ring 9, which is a double coupling ring with two adjacent openings 10 and 11 which at their central part have a supporting flange 12 against which the ends of the two tubes 1 and 2 can rest. A clearance 13 is present between the tube and the ring.

Figure 3:
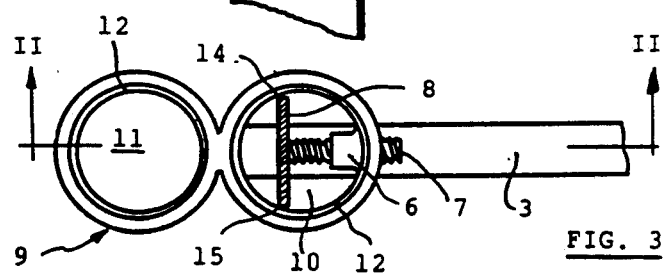
FIG. 3 is a top plan view of the arrangement shown in FIG. 2, with the indicated section line II—II for the section in FIG. 2.

The components described above and the contact lines 14 and 15 at the ends of the profiled rod 8 can be appreciated from FIG. 3. The fact that the contact lines 14 and 15 are situated at a certain distance from one another means that the tube connection is very rigid in the longitudinal sense. Because the two tubes are in contact with the supporting flange 12 and are prevented from sliding apart by the attachment devices 6, 7 inside the tubes 1 and 2 and the profiled rod 8, the tube connection is also very rigid in the transverse sense. This means that the tube connection is rigid in all directions.

The foregoing also means that the double coupling ring 9 is so firmly attached to the tubes 1 and 2 that it is capable of supporting a tube 16 in the manner indicated with broken lines in FIG. 2. A frame attached to the tube 1 is able to form any desired angle with the frame of which the tubes 1, 2 are a part. If it is desired for the assembled frames to be capable of being pivoted relative to one another, it is possible when assembling the tube connection to leave a small clearance between the ends of the tubes 1 and 2 and the supporting flange 12 of the coupling ring.

Figure 4:
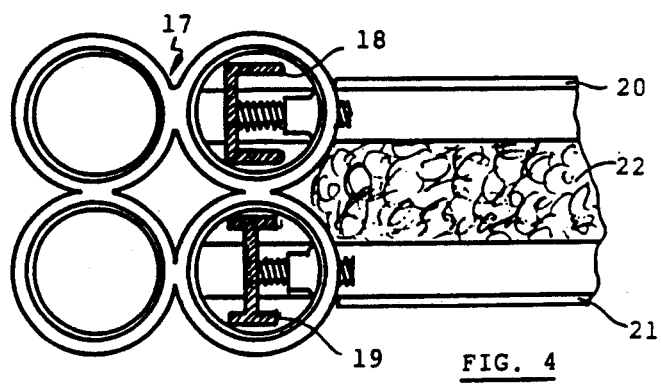
FIG. 4 is a top plan view from above, corresponding to that shown in FIG. 3, but with an adapter consisting of four interconnected coupling rings.

FIG. 4 illustrates a quadruple coupling 17 for the connection of up to eight lengths of tube. In the top right-hand opening of the coupling the profiled rod is in the form of a U-shaped profile, whereas in the bottom right-hand opening the profile rod has an I-shaped section. The two profiles are designated by 18 and 19. The greater rigidity of the profiled rods 18 and 19 permits the contact pressure to be increased, enabling the connection to absorb higher forces.

The arrangement shown in FIG. 4 with frames situated at a certain distance from one another can be used, for example, for the construction of partition walls in offices, etc., by securing panels 20 and 21 to the external surfaces of the frames. In the event of thermal or acoustical insulation being required, it is possible to install material 22 suitable for the purpose between the panels 20, 21.

Figure 5:
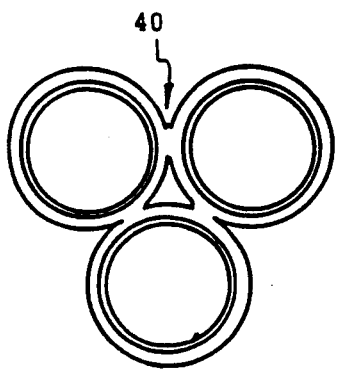
FIG. 5 is a top plan view from above of an adapter executed from three interconnected coupling rings.

FIG. 5 illustrates a coupling ring containing openings and flanges for up to three tubes to either side of the coupling ring.

FIG. 6 shows a locking component 23, which includes a head 24 and a profiled shaft 25 which may have any of the previously described cross-sections. The diameter of the head, which in the example shown here is adapted for a circular tube, is of approximately the same size as the external diameter of the tube.

FIG. 7 shows the locking component of FIG. 6 installed in the upper end of a frame tube 1 as a partially sectioned perspective view. The designations are those previously used.

FIG. 8 is a section through the tubular frame component shown in FIG. 7 and illustrates the function of the locking component. Application of the screw 7 causes the profiled shaft 25 to be forced against the internal wall of the tube 1 in the same way as described for the profiled rod 8. At the same time the head 24 of the locking component 23 is acted upon in such a way that it is tilted and is forced against the supporting flange 12 with one edge 26 of the head, thereby locking the double coupling ring 9 securely to the end 1 of the tube. Any desired number of tubes can be locked in a similar fashion in a secure connection.

FIG. 9 illustrates an embodiment with a profiled rod 27 which has been twisted about its straight central axis 28. This embodiment makes it possible to connect two frame tubes which are aligned at an angular relationship with one another.

FIG. 10 shows the components in FIG. 9 viewed from above. The manner in which the frames have been pivoted through an angle 28 in relation to one another can be appreciated from the Figure. This angle can be selected between 0° and 90°, which in turn makes it possible to select the angle between the frames within the range 0°-360°. The profiled rod 27 is thus twisted to the angle which it is wished desired for the frames to form. By selecting the length of the cross-section of the profiled bar 27 so that it is only slightly smaller than the internal diameter of the tube, it is possible to produce an effect for centering the tubes 1 and 2.

FIG. 11 illustrates a further example of the invention applied to the connection of square tubes, for which the designation 29 is used. The attachment device in this case consists of an eccentric disc or cam 30 which is capable of being turned until it is forced against the profiled rod 8 by means of a handle 32 on a pivot shaft 31. A simple coupling ring 5 as previously described is used to guide the tube ends. The ring thus rests against the four corners of the square tube.

FIG. 12 illustrates how the profiled rod 8 of FIG. 11 is forced against the inside of the tube in order to produce lines of contact 14 and 15.

FIG. 13 shows a tubular frame with feet 34 with foot plates 35 and a foot shaft 36. The foot shaft has a transverse section which may be executed in one of the ways previously described. The bottom ends 38 and 39 of the frame tubes have attachment devices 6 and 7 of a previously described design which lock the feet 34 to the frame, which can thus be adjusted vertically. A shelf 37 for books or other articles has been hung on the frame. It is, of course, possible to attach other devices to the frame.

FIG. 14 shows two frame structures arranged at an angle in relation to one another and connected by single coupling rings 5 and double coupling rings 9. It is obvious that any desired number of frames can be assembled one after the other, and that structures can be built with three or more frames, which are brought together at a single point with the help of coupling rings with three or more openings, as shown in FIGS. 3-5 above.

Figure 15:
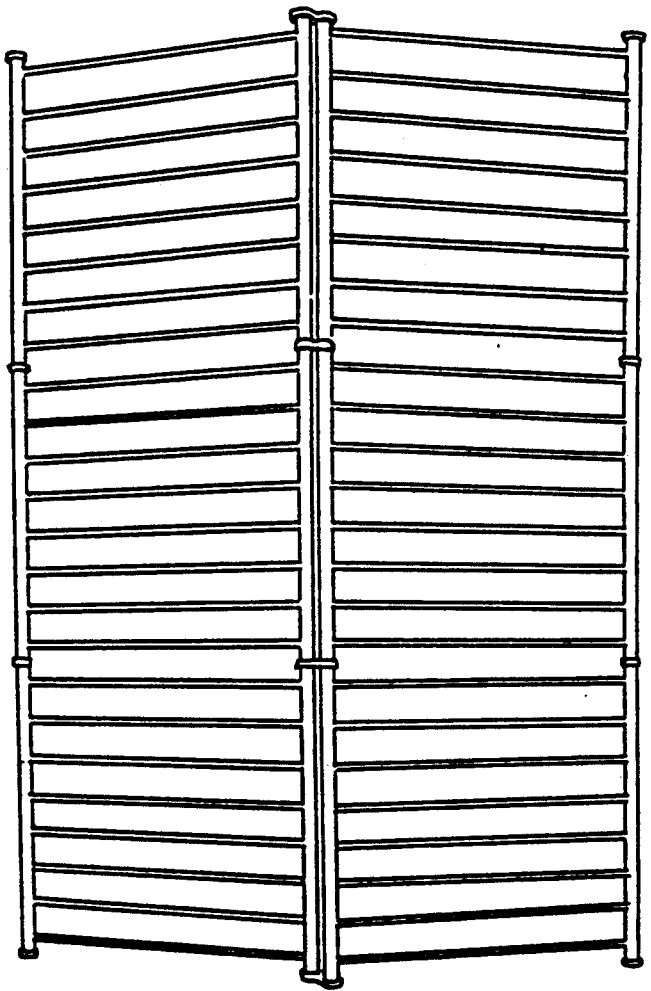
FIG. 15 is an illustrational view showing a wall consisting of six frames with twelve interconnected frame tubes set up on an uneven floor.

FIG. 15 shows two frame structures, each consisting of three frames fixed one above the other. The frame structures are connected to one another by means of double coupling rings 9, which are capable of pivoting relative to the frame tubes. This makes it possible for the tubes to adopt positions such that they are not entirely parallel to one another.

Figure 16:
FIG. 16 is a bottom plan view of the frames in FIG. 15.
Figure 17:
FIG. 17 is a top plan view of the frames in FIG. 15.

This can be appreciated in more detail from FIG. 16, which shows the position of the upper coupling ring, and from FIG. 17, which shows the position of the lower coupling ring. As will be appreciated from both Figures, a line passing through the center of the openings of the double ring 9 forms an acute angle with the plane of the tubular frames at the top, and an acute angle in the opposite direction towards the plane of the tubular frames at the very bottom. By connecting the frames together in this way it is possible to compensate for an uneven floor, where this is desirable when connecting a number of frames.

A person skilled in the art is capable of designing structures additional to those illustrated above by way of example and described within the scope of the accompanying patent claims.

We claim:

1. A coupling mechanism for joining at least first and second tubes in end to end assembled relationship along an axis comprising, a coupling guide means having an inwardly extending support flange which defines recesses on opposite sides thereof within said guide means, said recesses being of a size and configuration to cooperatively seat the ends of the tubes therein and against said flange so as to be in opposing relationship, an adjustable attachment means extending through the walls of each of said tubes and spaced from the ends thereof, a rod means extending through said guide means and into each of the first and second tubes, said rod means being of a generally uniform cross section along its length and extending beyond each of said attachment means, said rod means being compressed against the tubes by said attachment means so as to engage the tubes along two longitudinal lines of contact which are generally parallel with the axis of the tube.

2. The coupling mechanism of claim 1 in which said attachment means includes a threaded bushing extending within each of the first and second tubes and a screw cooperatively threadingly engaged with each of said bushings, said screws being engageable with said rod means.

3. The coupling mechanism of claim 1 in which said attachment means includes a cam means mounted within each of the first and second tubes, said cam means being selectively engageable with said rod means by rotation of said cam means relative to the tubes.

4. The coupling mechanism of claim 1 in which said rod means is generally rectangular in cross-sectional configuration.

5. The coupling mechanism of claim 1 in which said rod means is generally U-shaped in configuration.

6. The coupling mechanism if claim 1 in which said rod means is generally I-shaped in configuration.

7. The coupling mechanism of claim 1 in which said rod means has a longitudinal axis, said rod means having upper and lower portions having generally rectangular cross-sectional configurations and a central portion which is twisted so as to allow said upper portion to be disposed at an angle relative to said lower portion.

8. The coupling mechanism of claim 1, including at least one secondary guide means mounted generally coplanar with said guide means, said secondary guide means having an inwardly extending support flange and defining recesses on opposite sides thereof for receiving additional tubes mounted in generally parallel relationship with respect to the first and second tubes.

9. A coupling mechanism for mechanically connecting tubes comprising, a coupling guide means having an inwardly extending support flange which defines recesses on opposite sides thereof within said guide means, said recesses being of a size configuration to receive an end of a tube inserted with said recesses so that the tube contacts said support flange, at least one attachment means arranged through the wall of the tube at a distance spaced from the end of the tube, a profiled rod means having a generally constant cross-sectional configuration and arranged so as to extend through the guide means into the tube, said profiled rod means extending beyond said attachment means, said attachment means contacting said guide means and being adjustable so as to urge said attachment means into contact with the internal walls of the tube along two lines of contact which extend longitudinally of the tube, said rod means having opposite ends, a transverse plate extending from one of said ends of said rod means, said plate being engageable with said support flange of said guide means so that when said attachment means engages said elongated rod means said transverse plate will lock said guide means to the tube.

10. A coupling mechanism for mechanically connecting tubes comprising, a coupling guide means having an inwardly extending support flange which defines recesses on opposite sides thereof within said guide means, said recesses being of a size configuration to receive an end of a tube inserted with said recesses so that the tube contacts said support flange, at least one attachment means arranged through the wall of the tube at a distance spaced from the end of the tube, a profiled rod means having a generally constant cross-sectional configuration and arranged so as to extend through the guide means into the tube, said profiled rod means extending beyond said attachment means, said attachment means contacting said profiled rod means and being adjustable so as to urge said profiled rod means into contact with the internal walls of the tube along two lines of contact which extend longitudinally of the tube, said profiled rod means having upper and lower ends, a supporting foot means extending from said lower end of said profiled rod means and outwardly with respect to said guide means.

* * * * *